United States Patent [19]

Matin et al.

[11] Patent Number: 4,732,415
[45] Date of Patent: Mar. 22, 1988

[54] NON-METALLIC VACUUM PROBE

[75] Inventors: Barry D. Matin, Kent; George E. Trepus, Jr., Enumclaw, both of Wash.

[73] Assignee: The Boeing Company, Seattle, Wash.

[21] Appl. No.: 901,855

[22] Filed: Aug. 29, 1986

[51] Int. Cl.[4] .................................. F16L 37/24
[52] U.S. Cl. ............................... 285/169; 285/423;
285/360; 285/376; 141/384; 425/388;
425/DIG. 60; 264/DIG. 78; 264/511
[58] Field of Search ............... 285/423, 7, 169, 158,
285/360, 361, 362, 376, 377, 347, 910, 401, 402,
375; 141/65, 383, 384, 386, 387; 156/382;
264/257, 510, DIG. 78, 511; 425/388, 389,
DIG. 60

[56] References Cited

U.S. PATENT DOCUMENTS

| 544,467 | 8/1895 | Shepherd | 285/377 |
|---|---|---|---|
| 692,795 | 2/1902 | Moyle | 285/377 |
| 1,238,218 | 8/1917 | Thompson et al. | 285/377 |
| 2,613,089 | 10/1952 | Maiman | 285/376 |
| 2,726,104 | 12/1955 | Boitnoit et al. | 285/98 |
| 2,784,864 | 3/1957 | Giorgio | 285/376 |
| 3,054,628 | 9/1962 | Hardy et al. | 285/333 |
| 3,666,600 | 5/1972 | Yoshino | 156/382 |
| 3,687,473 | 8/1972 | Lock et al. | 285/333 |
| 3,977,709 | 8/1976 | Hatzis | 285/911 |
| 4,018,253 | 4/1977 | Kaufman | 141/65 |
| 4,229,024 | 10/1980 | Oberrecht et al. | 285/98 |
| 4,280,861 | 7/1981 | Schwartz | 156/382 |
| 4,291,889 | 9/1981 | Hardcastle | 285/374 |
| 4,417,638 | 11/1983 | Harvey | 285/7 |
| 4,443,028 | 4/1984 | Hayes | 285/361 |
| 4,477,109 | 10/1984 | Kleuver | 285/361 |
| 4,554,036 | 11/1985 | Newsom | 156/382 |
| 4,621,841 | 11/1986 | Wakefield | 285/911 |

FOREIGN PATENT DOCUMENTS

| 707236 | 4/1965 | Canada | 285/376 |
|---|---|---|---|
| 3116458 | 11/1982 | Fed. Rep. of Germany | 141/65 |
| 928633 | 6/1963 | United Kingdom | 285/401 |

Primary Examiner—Gary L. Smith
Assistant Examiner—Eric K. Nicholson
Attorney, Agent, or Firm—Conrad O. Gardner; B. A. Donahue

[57] ABSTRACT

A non-metallic vacuum probe for elevated temperature service having a probe body portion for coupling to a vacuum line. The probe body portion is coupled through a washer shaped low friction bearing surface and gasket for sealing to a probe flange portion. Interconnection of probe body portion and probe flange portion is provided through lug and ramp means. The probe flange portion includes vacuum channels on the bottom major surface region for vacuum bag and blanket curing of plastic components or panels in autoclaves or ovens.

6 Claims, 5 Drawing Figures

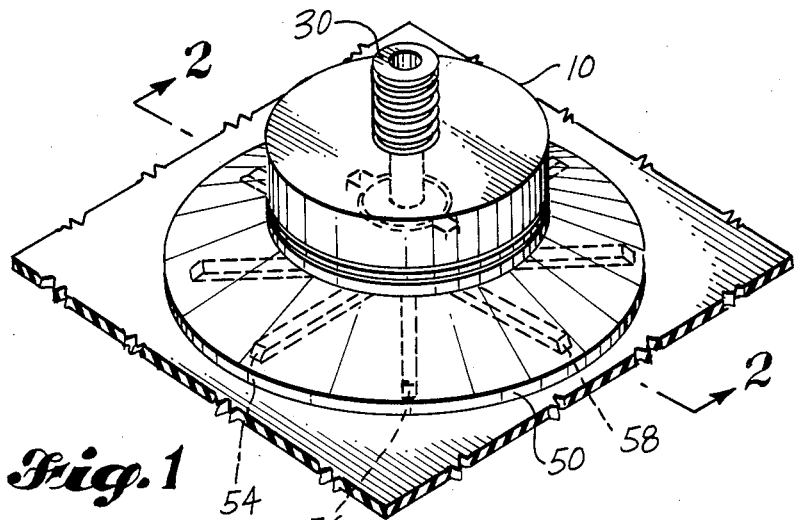
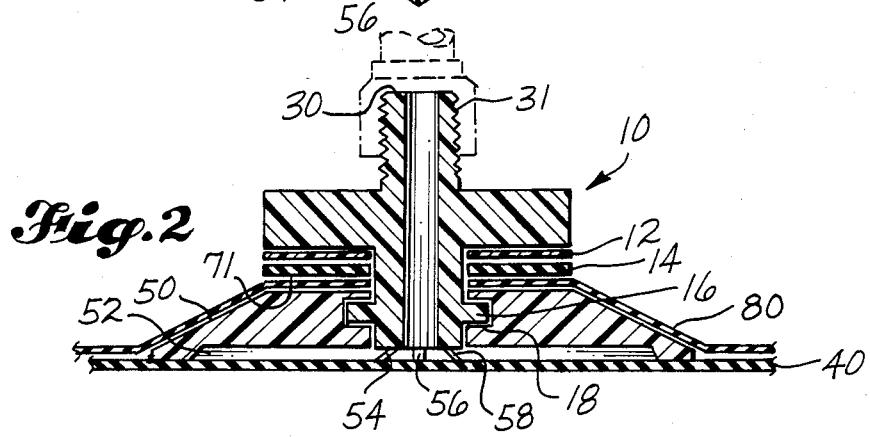
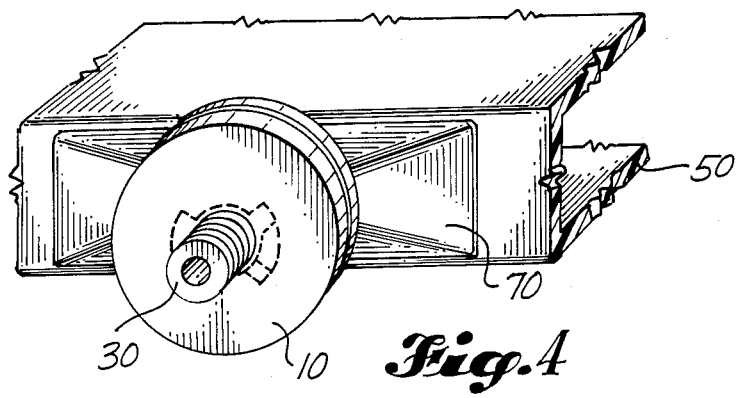

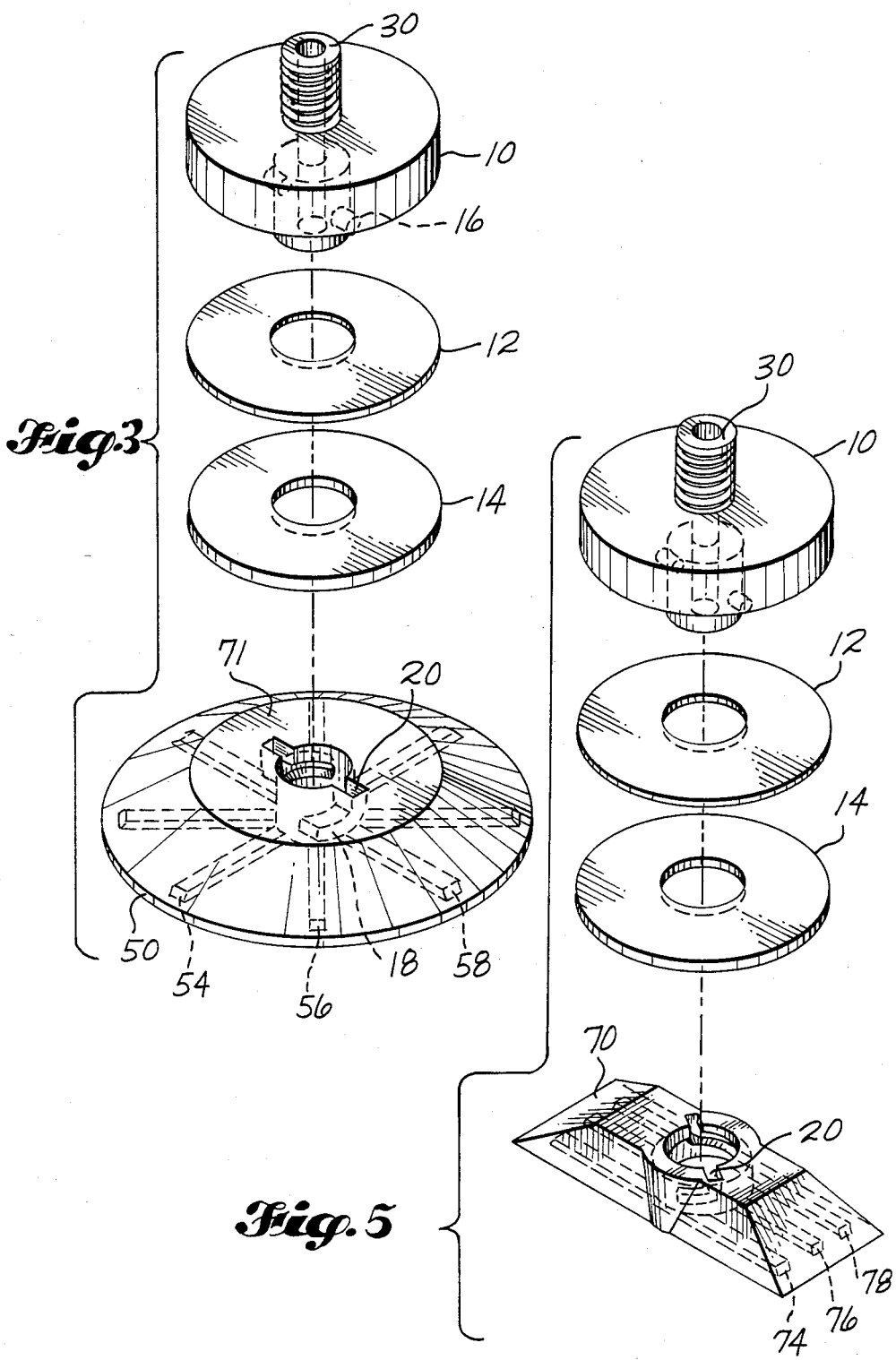

NON-METALLIC VACUUM PROBE

BACKGROUND OF THE INVENTION

1. Field of the invention

The present invention relates to vacuum probes for providing the connection between the vacuum bag or blanket barrier material and a vacuum source.

2. Description of the Prior Art

In the past, vacuum probes used for vacuum bag and blanket cures of plastic components or panels in autoclaves or ovens have been far from satisfactory. They have evolved from a metal tube penetrating the vacuum barrier and sealed with a mastic putty to relatively expensive machined aluminum contrivances which are relatively expensive. Also these devices have been manufactured from stainless steel which have been even more expensive to provide. The evolution of the vacuum probe has served to develop a better, more efficient probe but has resulted in generally a more complicated system with multiple components. These complicated systems with multiple components are not "User Friendly". There have been three major complaints from personnel utilizing such vacuum probes. These complaints are that there are too many components to assemble and further that the metal parts become too hot to handle and are occasionally dropped causing damage to the parts being processed or to the vacuum bag or blanket, or to the layup mandrel.

In the prior art patent literature of vacuum line coupling constructions there have been various types of couplings which incorporate a lug and ramp feature for pulling and locking devices together. In this respect U.S. Pat. Nos. 4,229,024; 3,687,493; 3,054,628; and 2,726,104 are illustrative.

SUMMARY OF THE INVENTION

The present invention alleviates to difficulties associated with the problems of users mentioned hereinabove, and further provides lug and ramping action between probe body portion and probe flange portion in a twisting motion to a lock condition without twisting the vacuum bag which would cause vacuum leaks. A rubber gasket is disposed intermediate the probe body portion and the probe flange portion providing a seal therebetween when the lug means carried by the lower end portion of the probe body portion is twisted and pulled into a locked position on the ramp means disposed on the probe flange portion. A washer shaped low friction bearing is provided between the cylindrically shaped probe body portion and the rubber gasket thereby permitting a twisting seal without twisting of the vacuum bag during the lug and ramp locking process. The ramping means coaxially disposed within the probe flange portion provides ¼ turn locking of the lug means on the probe body portion which consists of a pin disposed perpendicularly with and through the central axis of the probe body portion. A first embodiment of the probe flange portion is generally circular shaped while a further embodiment of the probe flange portion is of rectangular shape for assembly on the edge of a part or on a narrow projection. In the first and second embodiments of the probe flange portion the ramp means comprises a double semi-circular ramp to provide for assembly of the probe body portion to the probe flange portion with less than about a one-half twisting motion of one portion relative to the other portion.

BRIEF DESCRIPTION OF THE DRAWINGS

FIG. 1 is an isometric view of a first embodiment of non-metallic vacuum probe in accordance with the present invention and having a circular shaped lower probe flange portion;

FIG. 2 is a sectional view of the non-metallic vacuum probe embodiment of FIG. 1 taken along the lines 2—2 of FIG. 1;

FIG. 3 is an exploded isometric view of a non-metallic vacuum probe embodiment shown in FIG. 1 giving details of parts in the assembly;

FIG. 4 is an isometric view of a further embodiment of the present non-metallic vacuum probe having a rectangular shaped probe flange portion adaptable for use on a folded surface, edge of a part, or on a narrow projection; and FIG. 5 is an exploded isometric view of the non-metallic vacuum probe embodiment shown in FIG. 4 showing in more detail parts of the overall assembly.

DESCRIPTION OF THE PREFERRED EMBODIMENTS

Turning now to FIGS. 1, 2, and 3, it will be seen that the non-metallic vacuum probe assembly as shown in the first embodiment comprises a cylindrically shaped upper probe body portion 10 having a cylindrically shaped coaxially disposed protuberance 31 which is threaded to accept quick disconnects, fittings, and hose attachments 30 coming from a vacuum source (not shown). A lower disk shaped probe flange portion 50 includes in the bottom major surface thereof a surface indentation 52 having channels 54, 56, and 58 for developing a vacuum underlying the vacuum bag 80 on blanket barrier material 40. Lug 16 and ramp means 18 provide the interconnection between the upper probe body portion 10 and the lower probe flange portion 50 of the present first embodiment non-metallic vacuum probe in accordance with the present invention. Cylindrically shaped gasket 14 which may be made of a rubber e.g. silicone rubber is coaxially disposed about the axis of the non-metallic vacuum probe intermediate the lower major surface portion of cylindrically shaped probe body portion 10 and the upper surface portion 71 of probe flange portion 50. A low friction bearing surface is provided on both sides of washer shaped bearing member 12 which is positioned intermediate the lower surface portion of upper probe body portion 10 and rubber gasket 14. Washer shaped bearing member 12 is made of TEFLON having a thickness of about 0.020 inches. TEFLON is defined at Appendix 3 of the partial list of trademarks in the Manual of Patent Examining Procedure (5th ed. published by the U.S. Department of Commerce) as a synthetic resin polymer and products. Further definitions of the material "Teflon" which is a trademark of E. I. du Pont de Nemours & Company can be found at column 3 of U.S. Pat. No. 2,726,104 and column 3 of U.S. Pat. No. 3,054,628. The use of washer shaped bearing member 12 for providing a sliding bearing surface on both sides thereof allows twisting of the ramp and lug means for sealing without a resultant twisting of the vacuum bag which may cause vacuum leaks. The tendency of the vacuum bagging film to twist or rotate causing wrinkling and subsequent vacuum leakage with potential part failure due to vacuum loss is eliminated. The lug 16 and ramp means 18 (as seen best in FIG. 3) provides a locking together of the assembly of upper probe body portion with lower probe flange portion with less than one-half a twist of one of these parts with respect to the other.

As seen in FIG. 3 the lug means 16 comprises a pin extending transversely with respect to the central axis of the non-metallic vacuum probe which pin 16 has passed down vertically through slots 20 to a double semi-circular ramp 18 prior to twisting an interconnection of the present non-metallic vacuum probe assembly. Washer shaped gasket 14 may comprise a silicone rubber made of 50 to 60 Shore A hardness of a thickness of about 0.125 inches. Identical numerals are used with respect to identical parts in the second embodiment of the present non-metallic vacuum probe assembly shown in FIGS. 4 and 5. It can be readily seen that the upper probe body portion 10 of the second embodiment of FIGS. 4 and 5 has features identical to those shown in the first embodiments. The only difference between the first embodiment shown in FIGS. 1, 2, and 3 and a second embodiment shown in FIGS. 4 and 5 is the geometric shape of the probe flange portion, and in FIGS. 4 and 5 it can be seen that the lower probe flange portion 70 is flared down to a rectangular shape on its lower surface portion. As in the first embodiment of FIGS. 1, 2, and 3, the second embodiment of FIGS. 4 and 5 has a vacuum channel including a plurality of channels 74, 76, and 78 which are counterparts of channels 54, 56, and 58 seen in FIG. 1 of the first embodiment. The rectangular shaped bottom surface portion of the second embodiment shown in FIGS. 4 and 5 permits the present non-metallic vacuum probe to be readily used on a folded surface 50 as shown in FIG. 4 or on the edge of a part or narrow projection.

What is claimed is:

1. A non-metallic vacuum probe having a central axis and comprising in combination:
   a cylindrically shaped probe body portion having a cylindrically shaped coaxially disposed protuberance, said cylindrically shaped coaxially disposed protuberance having a threaded outer surface portion adapted for attachment to a vacuum source;
   a probe flange portion having a major surface portion disposed in a plane perpendicular with respect to the central axis of said non-metallic vacuum probe;
   a washer shaped rubber gasket coaxially disposed about the central axis of said non-metallic vacuum probe, said cylindrically shaped rubber gasket disposed between said cylindrically shaped probe body portion and said probe flange portion;
   a washer shaped bearing member disposed between said cylindrically shaped probe body portion and said washer shaped rubber gasket;
   an air flow passage coaxially disposed along said central axis of said non-metallic vacuum probe, said air flow passage extending through said cylindrically shaped probe body portion, said washer shaped bearing member, said washer shaped rubber gasket and said probe flange portion; and,
   lug and ramp means for interconnecting said cylindrically shaped probe body portion and said probe flange portion together.

2. The invention according to claim 1 wherein said probe flange portion is disk shaped.

3. The invention according to claim 1 wherein said probe flange portion has an exterior side surface portion which is flared down to a rectangularly shaped lower surface portion.

4. The invention according to claim 1 wherein said cylindrically shaped probe body portion and said probe flange portion comprise a fluoroplastic material.

5. The invention according to claim 1 wherein said cylindrically shaped probe body portion and said probe flange portion comprise a plastic material.

6. The invention according to claim 1 wherein said washer shaped bearing member comprises TEFLON, and said washer shaped bearing member has a thickness of about 0.020 inches.

* * * * *